United States Patent
Krawczyk (12)

(10) Patent No.: US 6,488,304 B2
(45) Date of Patent: Dec. 3, 2002

(54) RAPIDLY DEMOUNTABLE MULTIPLE PLATFORM UTILITY CART ASSEMBLY AND METHODS OF MAKING AND OPERATING IT

(75) Inventor: Joseph D. Krawczyk, Pinconning, MI (US)

(73) Assignee: Magline, Inc., Pinconning, MI (US)

(*) Notice: Subject to any disclaimer, the term of this patent is extended or adjusted under 35 U.S.C. 154(b) by 0 days.

(21) Appl. No.: 09/925,087

(22) Filed: Aug. 8, 2001

(65) Prior Publication Data

US 2002/0020989 A1 Feb. 21, 2002

Related U.S. Application Data

(60) Provisional application No. 60/226,202, filed on Aug. 18, 2000.

(51) Int. Cl.$^7$ .............................. B62D 53/00; B62B 1/00
(52) U.S. Cl. ........................ 280/408; 280/651; 280/654
(58) Field of Search ............................. 280/408, 416.1, 280/414.1, 460.1, 638, 651, 652, 79.11, 30, 47.13, 47.34, 47.35, 43.12, 43.13, 43.19, 411.1; 211/189, 175, 60.1

(56) References Cited

U.S. PATENT DOCUMENTS

| | | | |
|---|---|---|---|
| 1,474,477 A | 11/1923 | Huffman | |
| 1,474,478 A | 11/1923 | Huffman | |
| 1,832,770 A | 11/1931 | Hallowell | |
| 2,070,095 A | 2/1937 | Shepard, Jr. et al. | |
| 2,513,604 A | 7/1950 | Vandemark | |
| 2,563,919 A | 8/1951 | Christensen | |
| 2,784,999 A | 3/1957 | Hunt | |
| 2,813,727 A | * 11/1957 | Whalen | ........................ 280/408 |
| 2,823,047 A | * 2/1958 | Hutchinson | ................. 280/408 |
| D189,291 S | 11/1960 | Clarke | |
| 3,137,250 A | 6/1964 | Hutchinson | |
| 3,399,904 A | 9/1968 | Schinke | |
| 3,785,669 A | * 1/1974 | Doheny | ................... 280/47.12 |
| 4,006,914 A | 2/1977 | Koch | |
| 4,012,052 A | 3/1977 | Engdahl | |
| 4,110,869 A | 9/1978 | Hastings | |
| 4,326,731 A | * 4/1982 | Woychio et al. | ............. 280/641 |
| 4,531,752 A | 7/1985 | Diener | |
| D326,748 S | 6/1992 | Kirk | |
| 5,160,153 A | 11/1992 | Zan | |
| 5,228,716 A | 7/1993 | Dahl | |
| 5,244,221 A | 9/1993 | Ward | |
| D340,335 S | 10/1993 | Kean et al. | |
| 5,257,892 A | 11/1993 | Branch | |
| 5,476,282 A | 12/1995 | Dahl | |
| D366,745 S | 1/1996 | Kern et al. | |
| 5,484,150 A | 1/1996 | Yasutomi | |
| 5,536,034 A | * 7/1996 | Miller | ......................... 280/651 |
| 5,556,118 A | 9/1996 | Kern et al. | |
| 5,779,252 A | * 7/1998 | Bolton, Jr. | ................ 280/79.11 |

(List continued on next page.)

Primary Examiner—Brian L. Johnson
Assistant Examiner—Hau Phan
(74) Attorney, Agent, or Firm—Reising, Ethington, Barnes, Kisselle, Learman & McCulloch, P.C.

(57) ABSTRACT

A demountable multiple platform cart includes a lead cart module having a horizontal load-supporting platform and a trailing cart module having a horizontal load-supporting trailing platform. A releasable interconnection mechanism couples the rear end of the lead cart module demountably to the front end of the trailing cart module. The interconnection mechanism comprises an upstanding flange carried by the rear end of the lead cart platform at a spaced distance therefrom to provide an upwardly open continuous side to side slit and further comprises a downwardly extending flange carried on the front end of the trailing cart platform to be received within the slit. A longitudinally extending lock mechanism can be carried beneath a cart platform to receive a lock latch mounted on a handle which is pivotally and slideably mounted to move from an upstanding position to a generally horizontal position and telescopes longitudinally to locked stowed position.

10 Claims, 10 Drawing Sheets

U.S. PATENT DOCUMENTS

| | | |
|---|---|---|
| 5,816,419 A | 10/1998 | Lamson |
| 6,019,381 A | 2/2000 | Krawczyk |
| 6,024,376 A | 2/2000 | Golichowski et al. |
| 6,036,219 A | 3/2000 | Oefelein et al. |
| 6,079,941 A * | 6/2000 | Lee ......................... 280/79.11 |
| 6,095,348 A | 8/2000 | Karashima |
| 6,203,029 B1 * | 3/2001 | Ondrasik ................. 280/47.12 |

* cited by examiner

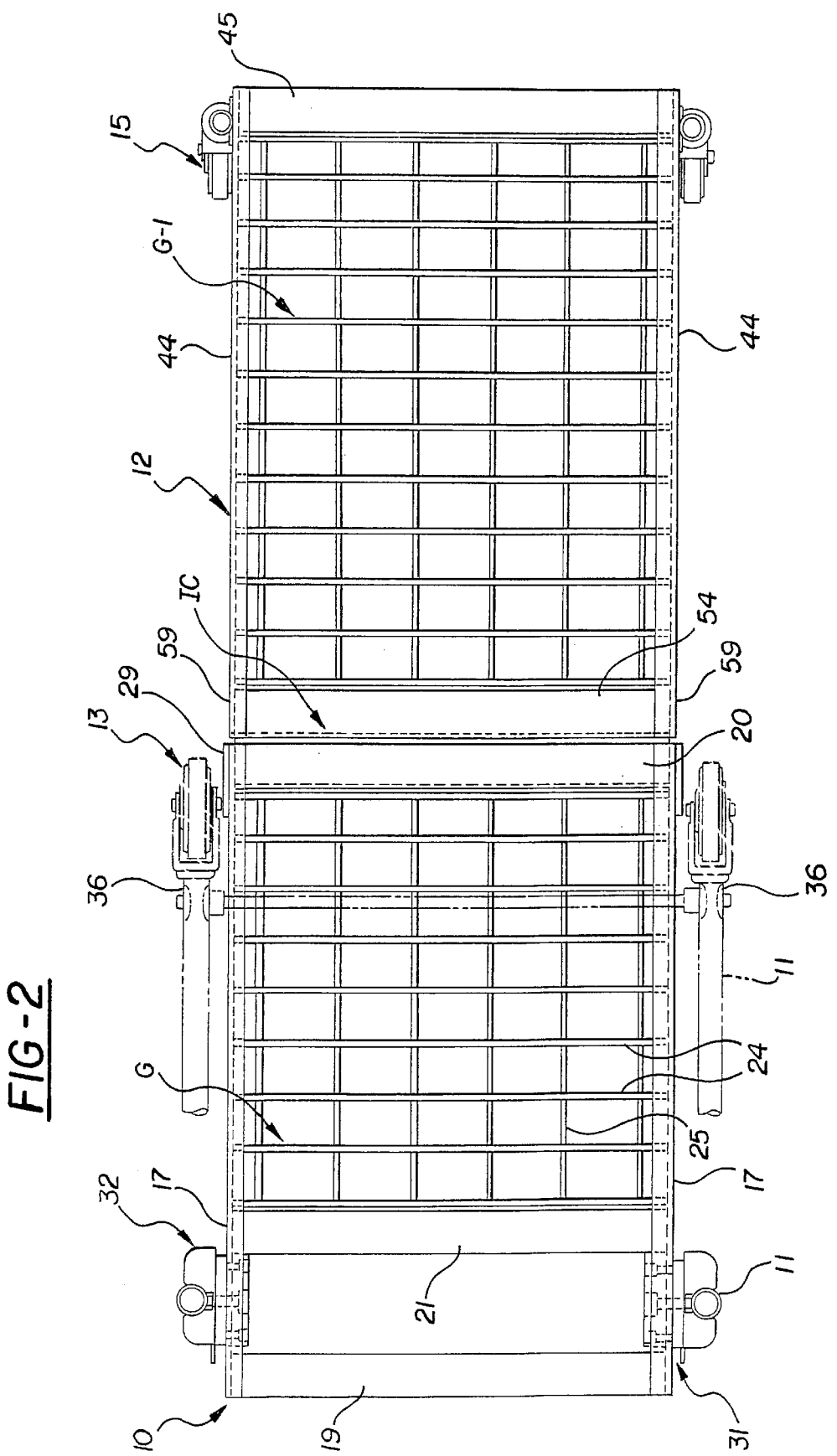

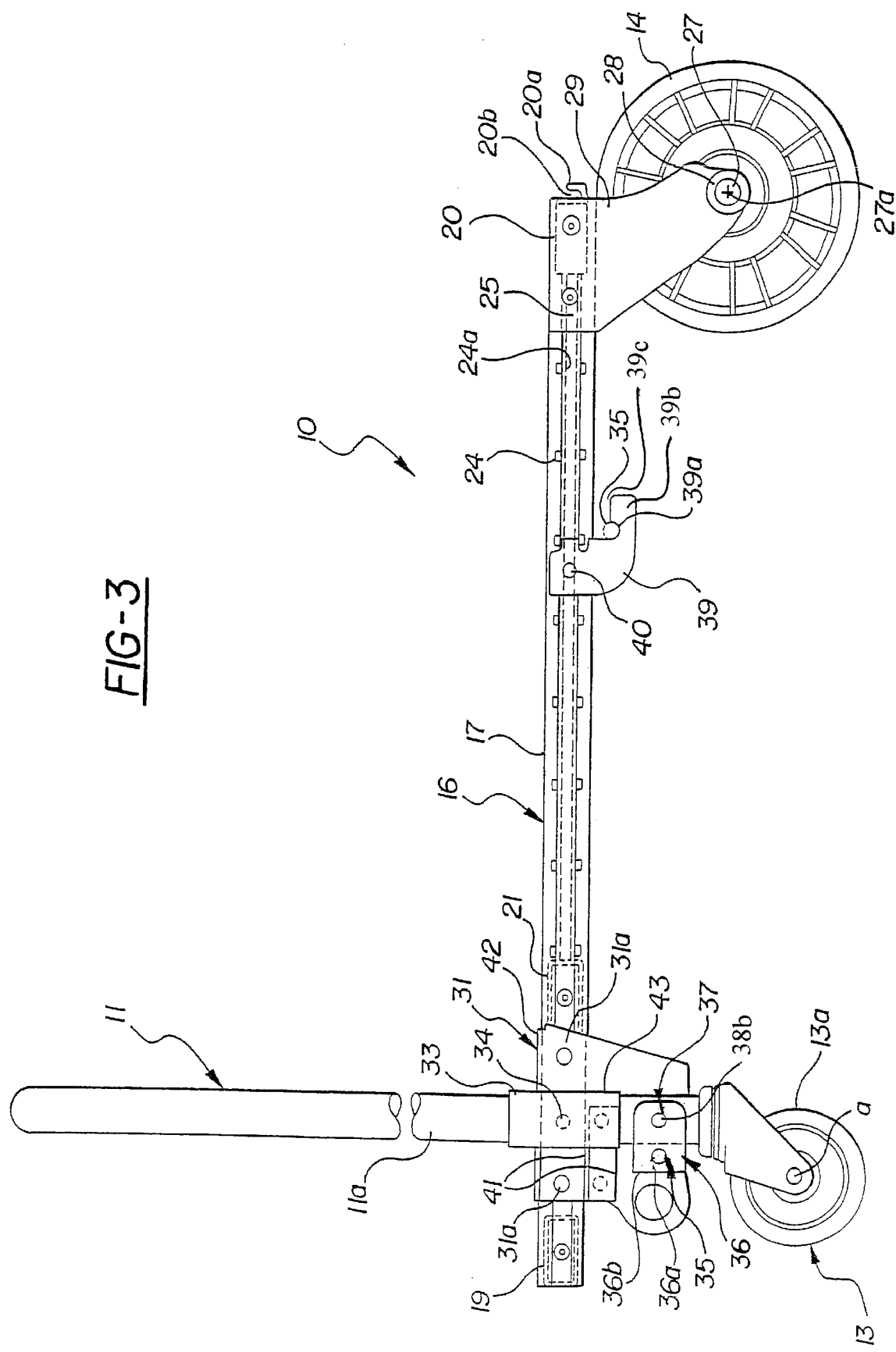

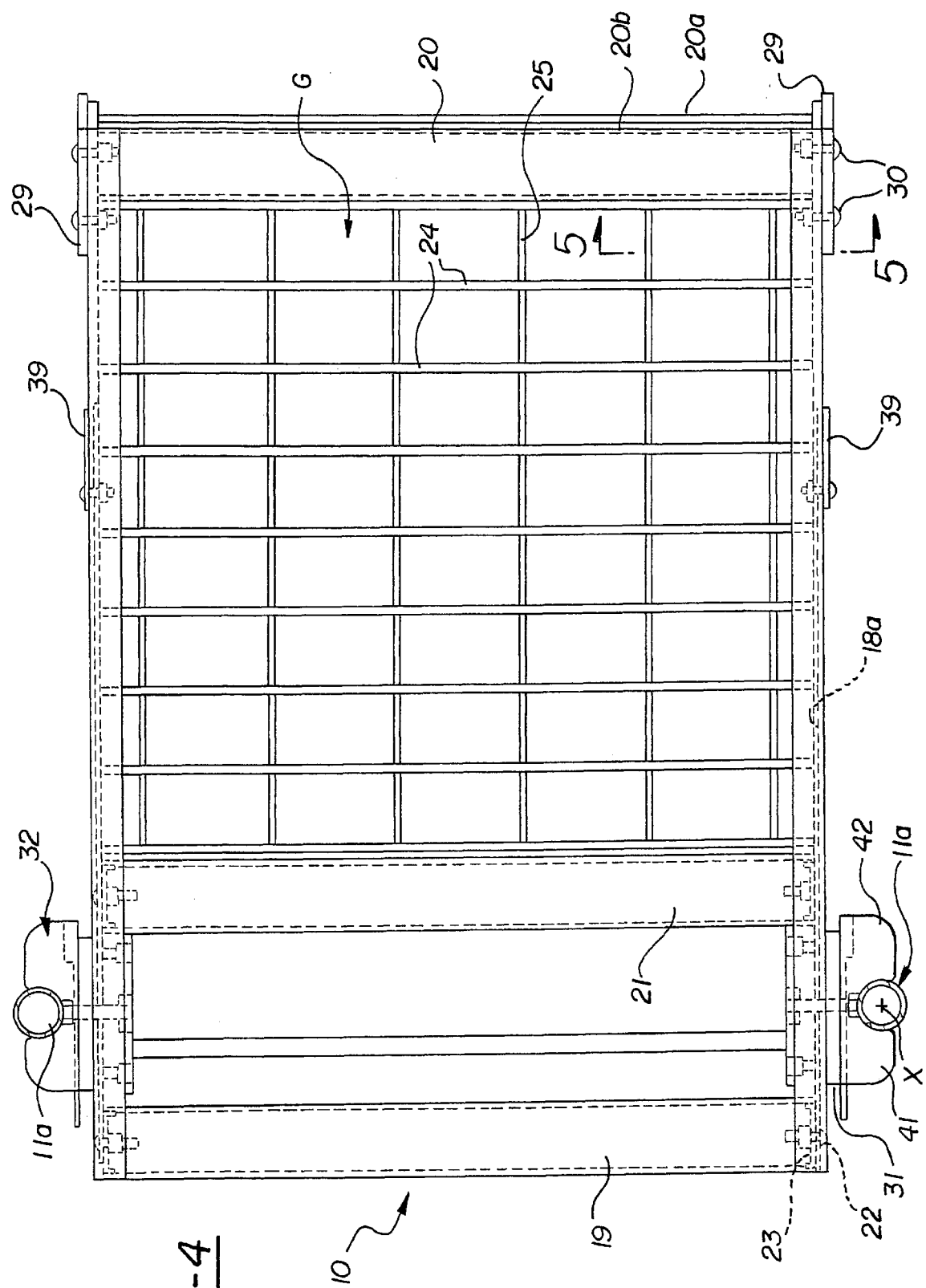

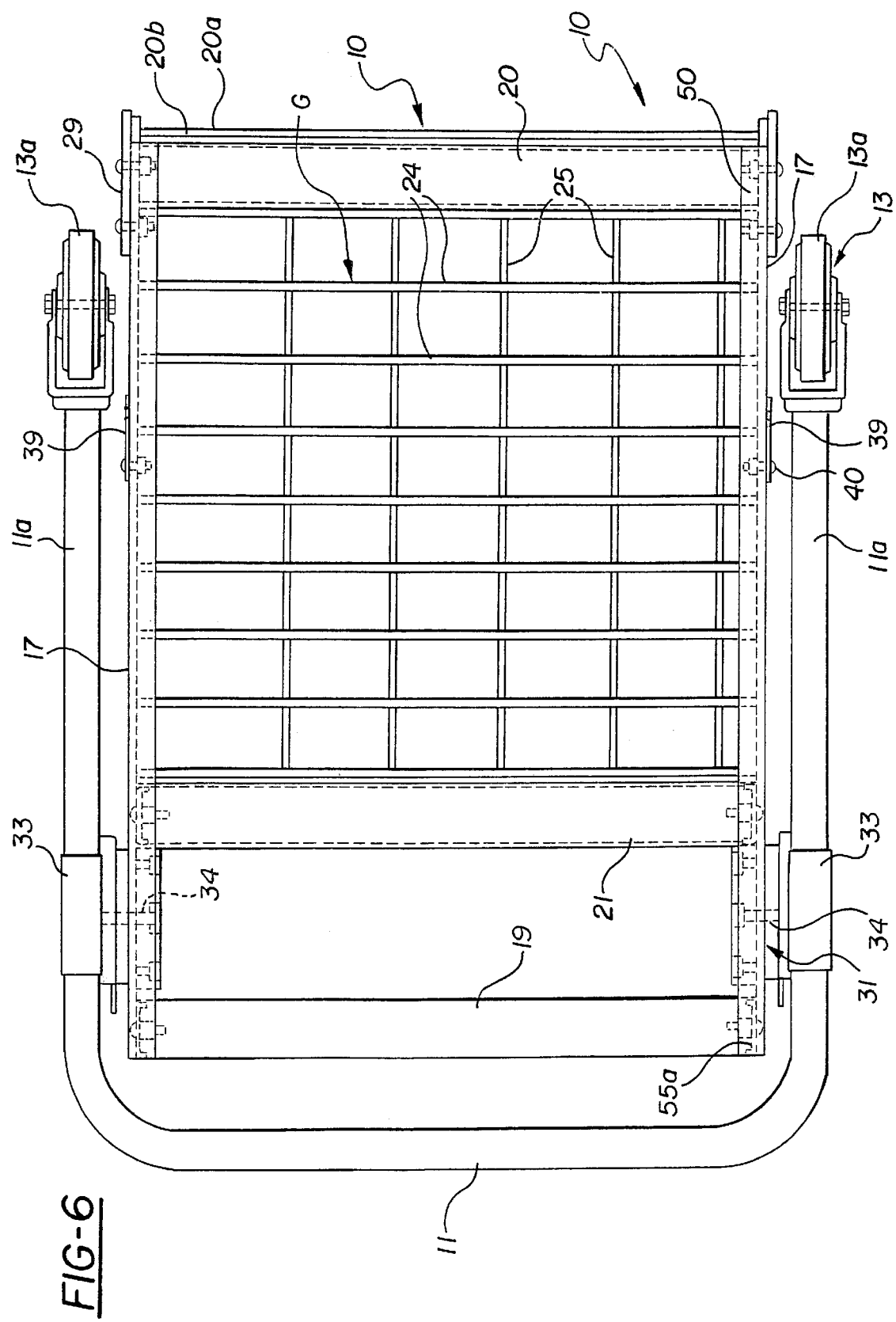

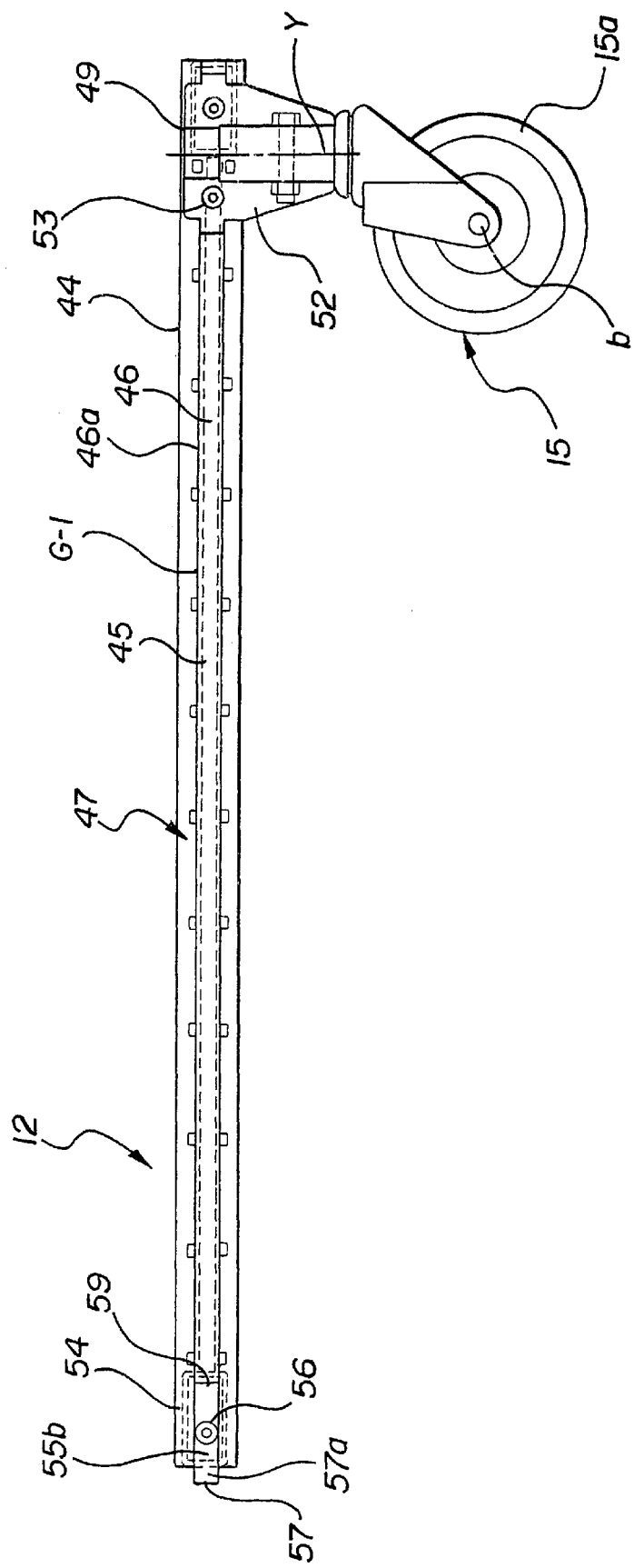

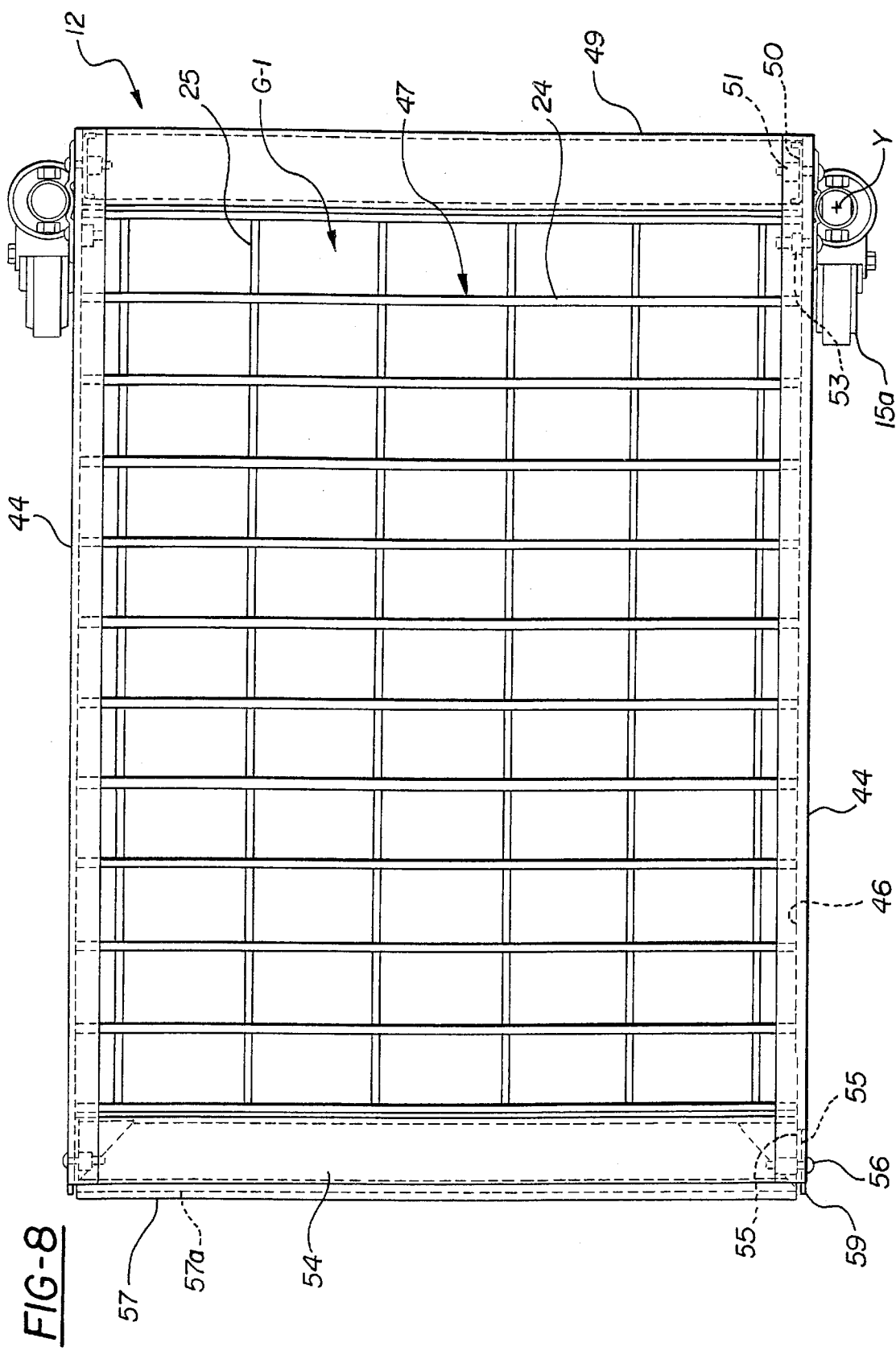

RAPIDLY DEMOUNTABLE MULTIPLE PLATFORM UTILITY CART ASSEMBLY AND METHODS OF MAKING AND OPERATING IT

This application claims the priority of U.S. provisional application Serial No. 60/226,202 filed Aug. 18, 2000.

This invention relates to hand propelled carts having multiple detachable platforms for transporting multiple heavy loads to point of sale and other locations. Such carts are useful, for example, for supporting stacked beverage cartons and may be referred to as merchandising trucks. While convertible hand trucks of the character disclosed in U.S. Pat. Nos. 3,785,669, 5,536,034, and 6,019,381, for example, are well known, they do not offer multiple detachable load bearing platforms. Such convertible hand trucks find utility in four-wheel as well as two-wheel configuration, but do not provide the versatility, or load carrying capacity, which characterizes the present merchandising truck.

It is a prime object of the present invention to provide a merchandising truck which can, for example, carry loads of as much as 1,500 pounds on platforms or load beds which each are capable of supporting loads of as much as 750 pounds.

A further object of the present invention is to provide a rugged, durable truck of the character mentioned which can be readily manufactured of lightweight materials such as aluminum.

Another object of the invention is to provide a merchandising truck which, while having the advantage of being readily demountable and foldable so that storage is convenient, has the required size and weight capacity.

Still another object of the invention is to provide a flatbed merchandising truck supported on a wheel system which is readily steerable when either pushed or pulled.

Still another object of the invention is to provide a lightweight portable truck that is readily transportable in compact demounted condition.

Still another object of the invention is to provide a very maneuverable cart of the type described which can be relatively economically manufactured and marketed.

Other objects and advantages of the invention will become apparent with reference to the accompanying drawings and the accompanying descriptive matter.

BRIEF DESCRIPTION OF THE DRAWINGS

The presently preferred embodiment of the invention is disclosed in the following description and in the accompanying drawings, wherein:

FIG. 2 is a schematic top plan view of the assembled cart, with chain lines again illustrating the general folded down position of the handle;

FIG. 3 is an enlarged schematic side elevational view of the front section of the hand truck only;

FIG. 4 is a schematic top plan view thereof;

FIG. 6 is an enlarged schematic top plan view showing the handle folded and slid down and into its storage position;

FIG. 7 is an enlarged schematic side elevational view of the rearmost load bed section;

FIG. 8 is a schematic top plan view thereof;

DETAILED DESCRIPTION OF THE DRAWINGS

Figure 1:
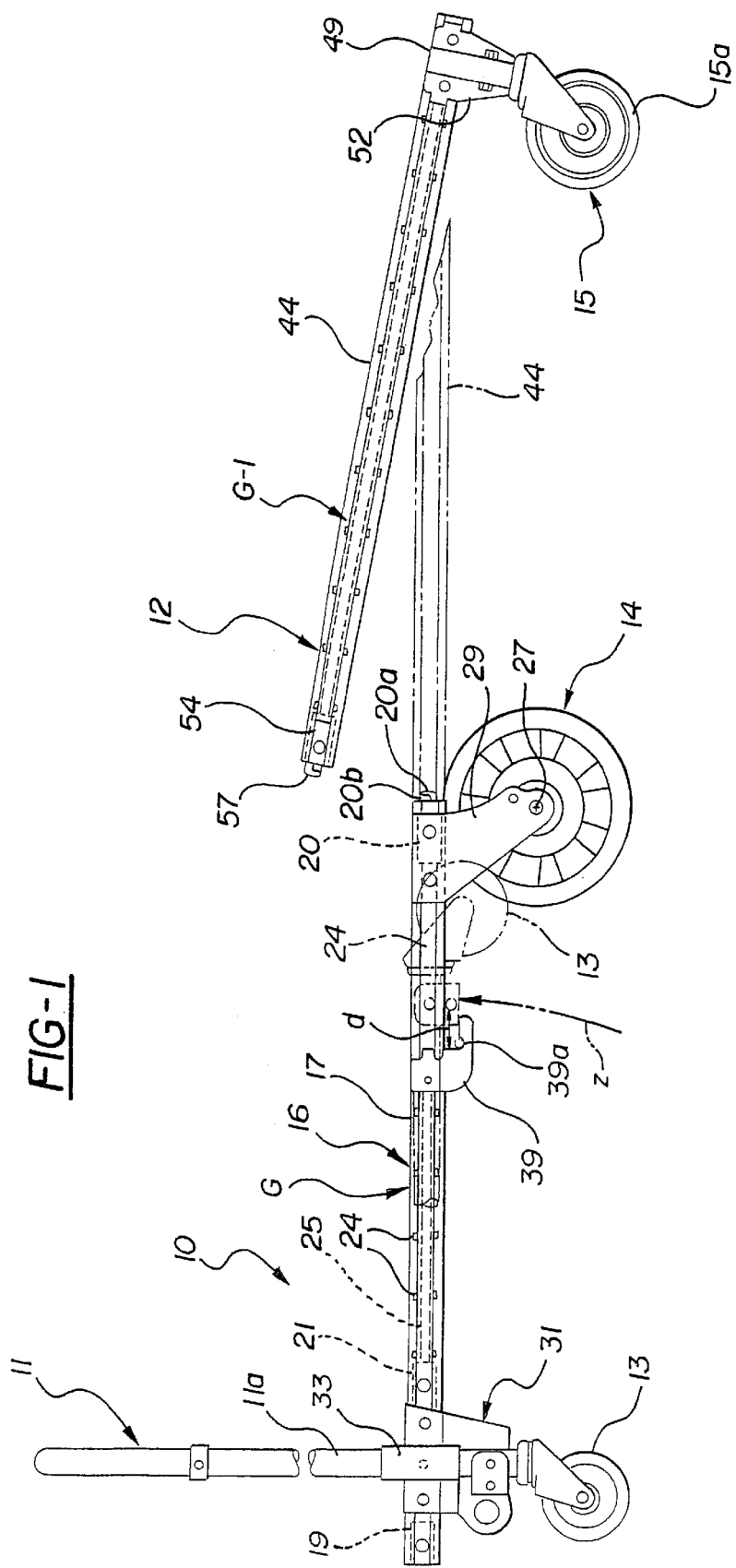
FIG. 1 is a schematic side elevational view of the merchandising cart with the rear platform shown in raised position after being disconnected from the front platform, the chain lines indicating the horizontal position of the rear platform or bed prior to disassembly, and partly the general folded position of the cart handle.

Referring now particularly to the accompanying drawings, and in the first instance to FIGS. 1 and 2 wherein the assembled six-wheel merchandising cart is shown, a numeral 10 generally indicates the front section of the cart or truck which can be pulled or pushed via an inversely U-shaped handle 11 having legs 11a. The numeral 12 indicates the rear section of the cart which detachably mounts to the front section 10 at an interconnection IC. At its front end, the front cart section 10 is swivelly supported on caster wheel assemblies, generally designated 13, with tired wheels 13a, and at its rear end on non-castered, fixed axis rotatable wheels 14. The rear cart section 12 is swivelly supported on caster wheel assemblies 15 having tired wheels 15a at its rear end and is unsupported at its front end when disassembled.

Figure 9:
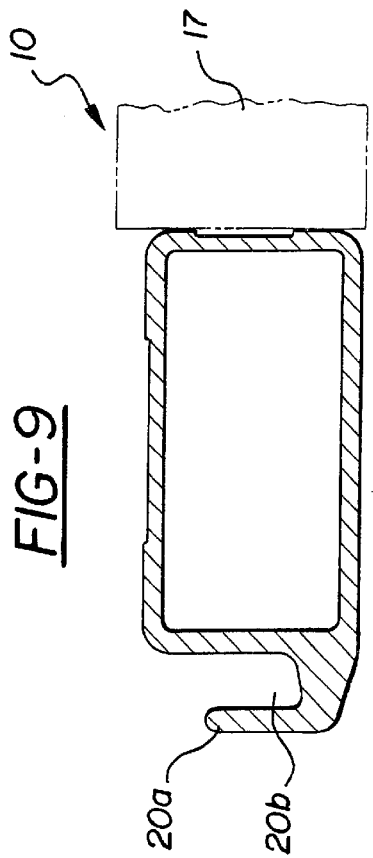
FIG. 9 is an enlarged cross-sectional view illustrating the rear rail of the load bed of the frontal cart section in transverse enlarged section.
Figure 6B:
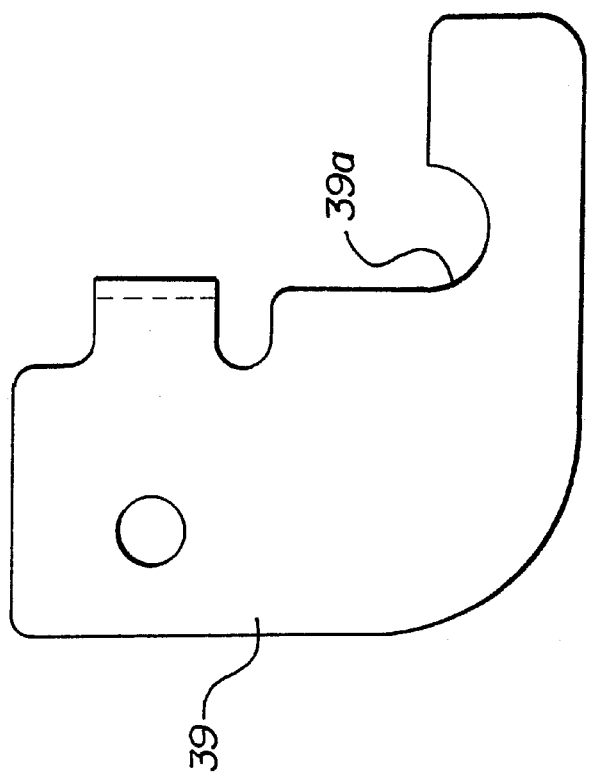
FIG. 6B is an enlarged side elevational view of one of the latch members.
Figure 6A:
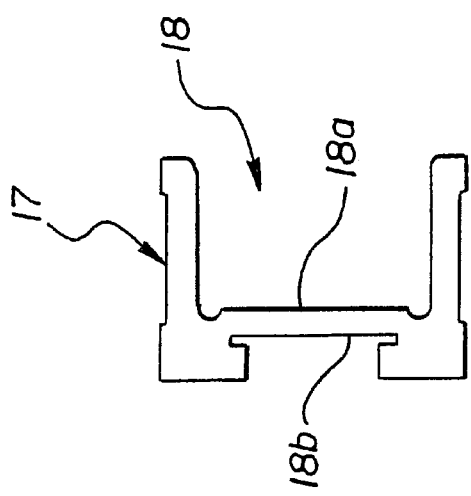
FIG. 6A is an enlarged end elevational view of the side rails used in both the front and rear sections of the cart.

Considering now the front cart section 10 in the first instance, it will be seen that it comprises a horizontal platform or load supporting flatbed, generally designated 16, made up of channel-shaped side rails 17 of the configuration disclosed in FIG. 6A which have inwardly facing channel recesses 18 and web side walls 18a with shallow grooves 18b. Received within the channel recesses 18 are the ends of front and rear cross beams 19 and 20, respectively, with cross beam 20 having the cross-sectional configuration shown in FIG. 9 which provides an upturned lip 20a spaced from the beam proper to provide an elongated internal slit or groove 20b of a predetermined height and width which extends completely across the load bed 16 as shown in FIG. 4 and is open at its ends. An intermediate cross beam 21, spanning the side rails 17 and likewise received within the channels 18, is also provided, and beams 19, 20, and 21 may be readily secured to the rails 17 by bolt and nut fastener assemblies 22 as shown, extending through the side rails 17 and the brackets forming the end walls 23 of beams 19–21.

The side rails 17 and cross beams 21 and 20 are spanned by a grating or grid G comprising transverse grid rods 24 and longitudinal grid rods 25 to which they are fixed, the rods 25 extending snugly through openings 24a in I beam configured rods 24. It will be seen in FIG. 4 that the ends of the members 24 are of a length to extend into the recesses in channel side rails 17 substantially into engagement with the vertical web walls 18a thereof.

The wheels 14, which have tires mounted on their rims, are rotatably mounted laterally inboard of rails 17 on an axle 27 (see FIG. 5), which spans the wheels 14 and is received within hubs 28 provided on wheel supporting brackets 29 which fix to the rear ends of side rails 17. It is important to note that the socket 20b is vertically aligned with the axis 27a of axle 27. The wheel supporting brackets 29 may be secured to the side rails 17 by appropriate fasteners 30.

Fixed to the side rails near the front end of cart section 10, as with fasteners 31a, are right and left handle plate assemblies or fittings, generally designated 31 and 32, respectively, which may be of the configuration disclosed in the aforementioned patents. The members 31 and 32 incorporate socket tubes or sleeves 33 which are rotatable about pivot fasteners 34 which mount them to the side rails 17. The lower ends of the legs 11a of handle 11 extend through these socket tubes 33 and are slideable therein. Spanning the handle legs 11a are rods 35 mounted in U-shaped clamps or clips 36 which secure to the legs 11a, as with fasteners 37. The handle plate assemblies 31 and 32 have downwardly facing recesses or sockets 38 and 38a (see FIG. 10) for receiving the handle rod 35 and the stub rods 38b provided on fasteners 37 respectively, thereby normally holding the sleeves 33 and handle 11 in upright operative position.

It will be noted that the U-shaped clamp members 36 have rod mounting legs 36a, bridged at their front ends by a connecting wall 36b. As later will be explained, rod or lock part 35 cooperates with latch fittings 39, fixed to the rail 17 in predetermined position by fasteners 40, to hold the folded-down handle 11 and sleeves 33 in the stowed position indicated in FIG. 10. When the handle is in upright position, as shown in FIG. 3, spaced apart fixed lower brace plates 41 on the assemblies 31 and 32, curvilinearly cut out at their rear ends, receive the socket tubes 33 and frontally brace the tubes 33. Each socket tube 33 is further braced from the rear in vertical position by an upper plate 42 fixed on each handle plate assembly. It is to be understood that the handle plate assemblies 31 and 32 have been used previously as a part of convertible hand trucks but have not to applicant's knowledge been used to move to and from a stowed position beneath a flatbed platform.

Referring now more particularly to FIGS. 7 and 8, the rear section of the cart 12 includes side rails 44 of the same configuration as side rails 17, with inwardly facing open channels 45 and vertically extending side walls 46 having the same shallow grooves 46a. The rear cart section flat load bed 47 which is provided is supported at its rear end by the caster wheel assembly 15 with the tired wheel 15a, but is unsupported by any wheeled structure at its front end. At their rear ends, the side rails 44 are connected by a crossbeam 49 of the open rectangular configuration indicated in FIG. 7. The beam 49 is of the same configuration as the beams 19 and 21 and, similarly, has end walls 50 formed by brackets which are secured within the rail sockets 45 by fasteners 51. The caster wheel assembly 15 is supported by a bracket 52 at each side of the cart section 12 and secures to the side rails 44 as with fasteners 53.

Figure 9A:
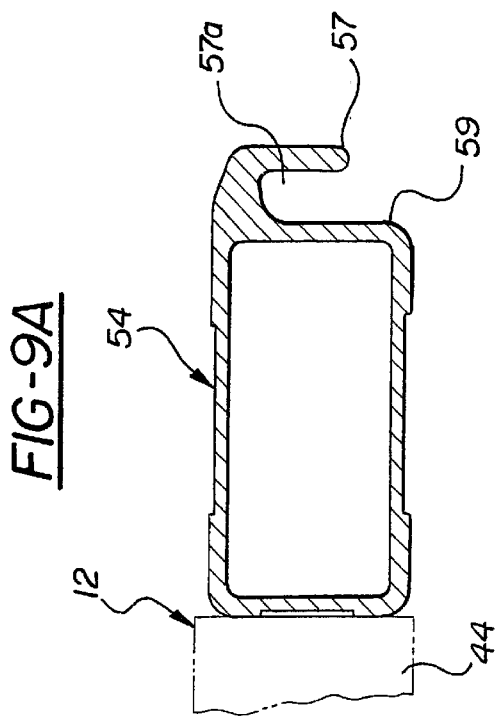
FIG. 9A is a similar view of the frontal rail of the load bed of the rear cart section.

At the front end of rear load bed section 12, a front rail 54 of the configuration disclosed particularly in FIG. 9A is provided. The front rail 54 has bracket-formed end walls 55 which are received within the channels of the side rails 44 and secure to them by means of fasteners 56. As FIG. 9A particularly illustrates, an overhanging lip or flange 57 is provided at a spaced distance outwardly from the front side wall 59 of the front beam 54 to provide a continuous slot or slit 57a between the lip 57 and side wall 55b of beam 54. The height and thickness of the lip 57 and slit 57a are predetermined so that lip or flange 57 is received within the upwardly open slot or slit 20b provided on the rear cross rail 20 of the front cart section 10 and the lip or flange 20a is received within the downwardly open slot 57a. The members 57, 20a, with slots 57a and 20b, comprise the cart section interconnection IC. Both continuous slots 20b and 57a are open at their ends. The rear cart section 12 is provided with the same grid, now designated G-1, provided for the front cart section 10 and comprised of transverse members 24 whose ends are received within the channels of channel sections 44 and longitudinally extending members 25. The beams 20 and 54 and the grids G and G-1 of each cart section 10 and 12 are maintained in horizontal alignment by the configuration of the connection IC provided by lips 20a and 57 and the grooves 20b and 57a.

The front caster wheel assembly 13 is rotatable about vertical axis "x" and the rear wheel caster assembly 48 is rotatable about the vertical axis "y". The caster wheels 13a, which rotate about transverse axis "a", are slightly smaller in diameter than the caster wheels 15a which rotate about the transverse axis "b". Both are of considerably lesser diameter than the wheels 14, which rotate about transverse axis 27a. For example, front caster wheels 13a may be four inches in diameter and caster wheels 15a five inches in diameter, when wheels 14 are eight inches in diameter. All of these wheel assemblies are of conventional character, but it is their disposition and relative size which are important to the present construction to provide proper tracking in horizontal alignment, taken together with the fact that the An height of the interlocking members 57 and 20a is so gauged that the load beds of the cart members 10 and 12 are maintained in horizontal disposition at the same level. Caster wheel assemblies of the general type disclosed in recent U.S. Pat. No. 6,094,846 may be utilized.

Stop plates 59 secured in the grooves 46a of side rails 44 by the fasteners 56 project forwardly as shown particularly in FIG. 8 at a slightly laterally spaced distance outwardly from the ends of lips 20a and 57 to prevent lateral disengagement of the lips 20a and 57 and cart sections 10 and 12, while providing for some lateral play facilitating cornering.

Returning now, more particularly, to the dependent latch member 39 fixed on each side rail 17, it will be seen that latch 39 is provided with a longitudinally extending part 39b beneath each rail 17 having a locking socket 39a, as shown particularly in FIG. 6B. It is to be understood that it is rod or lock part 35 which passes through latch entrance openings or passages 39c and is received within the upwardly open sockets 39a to dispose the handle member 11 in the horizontal stowed position shown in FIGS. 2 and 10. The position of the rod 35, when the handle 11 is in the stowed position is also indicated in chain lines in FIG. 3.

THE OPERATION

Figure 10:
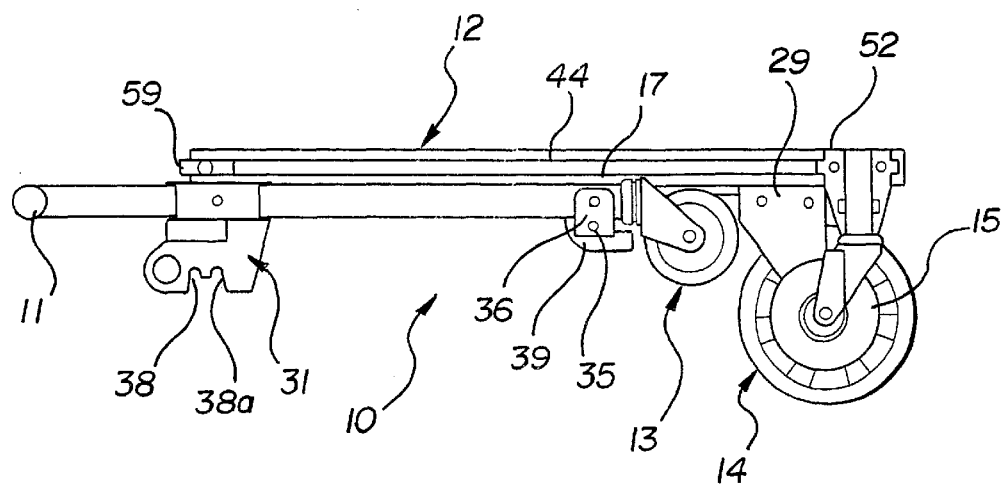
FIG. 10 is a schematic side elevational view showing the various elements of the truck in disengaged storage position.
Figure 11:
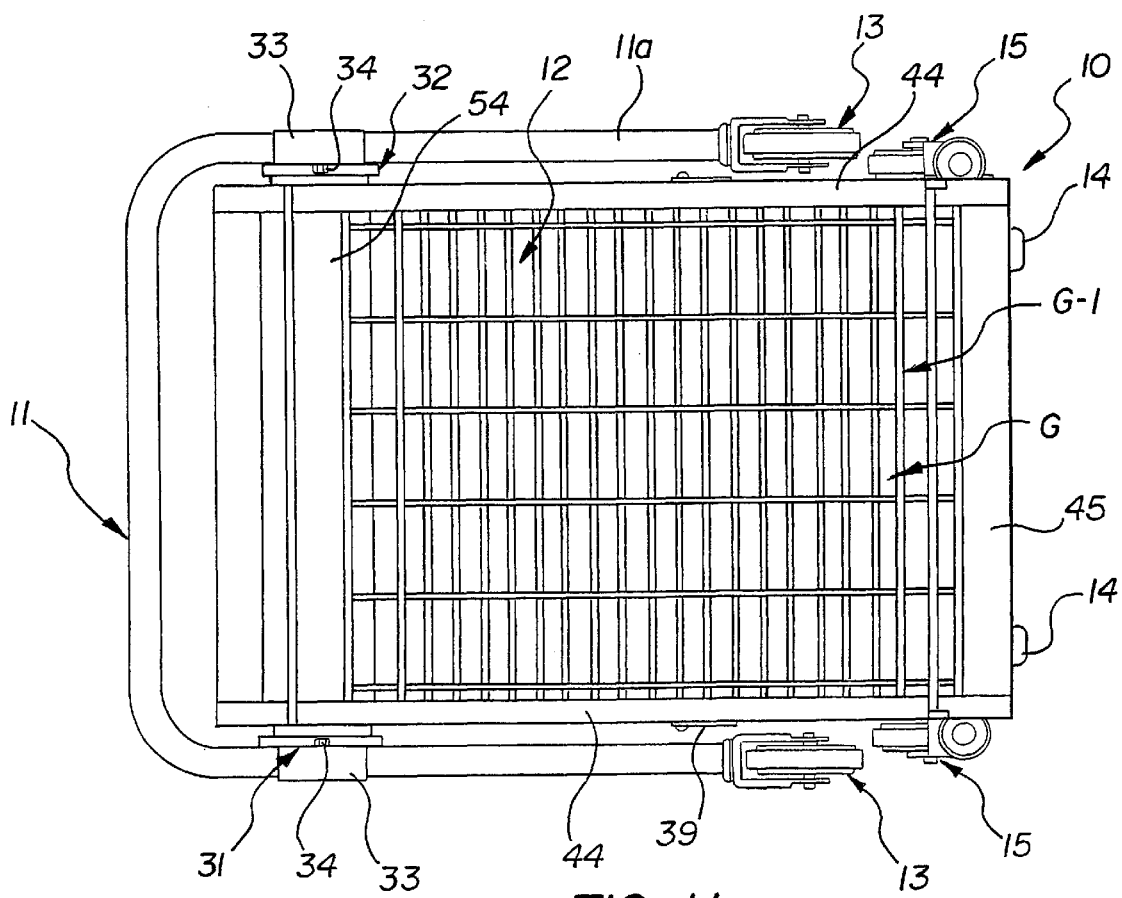
FIG. 11 is a schematic top plan view thereof.

In operation, to reach the stowed position shown in FIGS. 10 and 11, the front end of cart section 10 is raised to disengage the rods 35 and 37 from the openings 38 and 38a, and handle 11 and sleeves 33 are then pivoted about the fasteners 34. At the same time, the handle 11 legs and 11a are forced downwardly through sleeves 33 and eventually are pivoted upwardly as FIG. 1 indicates by the arc "z" to reach the broken line position shown in FIG. 1, with rod 35 forwardly of latch 39. The handle 11 may then be moved rearwardly in FIG. 1, as indicated by the arrow "d", to seat the rod 35 in the hook sockets 39a. To restore the handle 11 to the upright position, it is merely necessary to reverse the procedure with the legs 11a first being raised to remove the rod 35 from sockets 39a, prior to pushing the handle 11 rearwardly sufficiently for the rod 35 to clear the hook members 39, before swinging handle 11 upwardly. The hook members 39 with sockets 39a have not been used previously as a latching mechanism for such a handle to applicant's knowledge.

Figure 5:
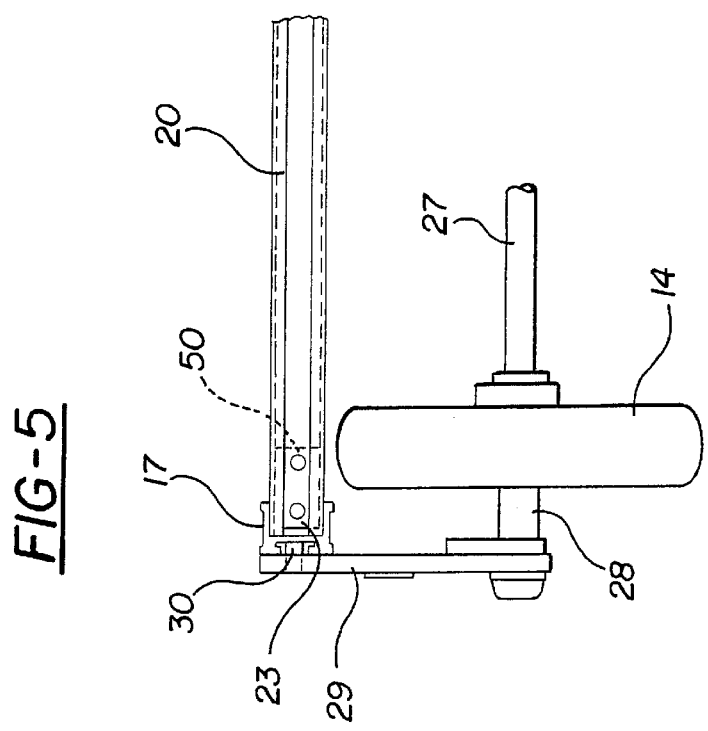
FIG. 5 is an enlarged schematic transverse sectional view, taken on the line 5—5 of FIG. 4.

Normally, the weight of cart section 12 is sufficient to keep the interlock IC between lips 20a and 57 engaged on the surfaces on which the cart normally travels. This is particularly the case, of course, when the platforms 16 and 47 are supporting the heavy loads contemplated. To disengage the rear bed cart section 12, however, for stowing of the cart parts in a disengaged non-load bearing relationship, it is merely necessary to lift the front end of cart section 12 upwardly to disengage lips 20a and 57. As shown in FIG. 10, the rear cart section 12 can then be lifted and moved forwardly to rest on the bed 16, as shown in FIG. 10 in a vertically stacked relationship. Because the wheel assemblies 14 are supported inwardly of side rails 17 as shown in FIGS. 5 and 11, the wheel assemblies 14 do not prevent the stowed position of the rear cart section 12 disclosed particularly in FIGS. 10 and 11.

In use, the cart assembly or composite cart may be moved from right to left in FIG. 2 by pulling handle 11 forwardly or from left to right by pushing on handle 11. Both movements are effected when jockeying the cart into the desired location. The terms "lead" and "trailing" and "front" and "rear" are intended to be simply descriptive of the drawings and not as limiting the scope of the claims. Moreover, the handle 11 will be attached to either the leading or trailing cart module dependent on the direction in which the cart is moving. It is recognized the cart will be moved in both directions and the use of these terms is arbitrary to describe a stationary cart.

It is to be understood that the embodiment described is exemplary of various forms of the invention only and that the invention is defined in the appended claims which contemplate various modifications within the spirit and scope of the invention.

I claim:

1. In a demountable multiple platform cart assembly:
   a. a lead cart having a horizontal load-supporting platform with sides and front and rear ends;
   b. laterally spaced non-castered wheels laterally inset from said sides mounted to and carrying said rear end of said lead cart platform;
   c. a fitting mounted on each side of said lead cart platform at said front end of each said lead cart platform, each said fitting carrying an open-ended sleeve mounted for pivotal movement from a generally vertical operative position to a generally horizontal stowed position;
   d. a handle having laterally spaced legs mounting castered front wheels of smaller diameter than said non-castered wheels slideably received in said sleeves for telescopic movement from a vertically extending operative position when said sleeves are in operative position to a telescoped rearwardly extending stowed position beneath said lead cart platform when said sleeves are pivoted to stowed position;
   e. a trailing cart, movable between operative and stowed positions, having a horizontal load-supporting trailing platform with sides and front and rear ends;
   f. a pair of laterally spaced castered rearmost wheels mounted on and carrying said rear end of said trailing cart platform; said pair of rearmost castered wheels being laterally spaced a distance less than the lateral spacing of said non-castered wheels and positioned to be movable between them when said trailing cart is moved forwardly to stowed position with said front end of said trailing cart above said lead cart;
   g. a releasable interconnection mechanism for coupling said rear end of said lead cart demountably to said front end of said trailing cart with the platform of said lead cart in horizontal alignment with the platform of said trailing cart and furnishing the sole support for the front end of said trailing cart;
   h. said interconnection mechanism comprising an upstanding flange carried by said rear end of said lead cart and extending at a spaced distance rearwardly of said platform of said lead cart from side to side thereof to provide an upwardly and sidewisely open side to side continuous first slit adjacent to said rear end of said lead cart platform, and further comprising a downwardly extending flange to be received in said first slit carried on said front end of said platform of said trailing cart at a spaced distance forwardly of said platform to provide a downwardly and sidewisely open side to side continuous second slit to receive said upstanding flange; said interconnection mechanism further having stop surfaces for limiting the vertical position of said downwardly extending flange in said first slit to carry said platforms of said lead cart and said trailing cart in horizontal alignment and being provided with lateral stop surfaces carried at a spaced lateral distance outward of said platform sides for preventing relative lateral shifting of said rear end of said lead cart platform and front end of said trailing cart platform beyond a predetermined limit;
   i. a lock mechanism carried beneath said lead cart platform and comprising a rearwardly extending part at each side of said cart spaced vertically below said platform and configured to provide a pair of rear access openings spaced forwardly of said non-castered wheels leading to upwardly open locking recesses forwardly of said access openings;
   j. a lock rod spanning said legs of said handle inward of said castered wheels thereon positioned to be received in said locking recesses when said handle is telescoped during pivoting movement of said sleeves to stowed position to a rearwardly extending position in which said locking rod when swung upwardly is rearward of said access openings and can be brought forwardly to be received within said locking recesses with forward telescopic movement of said handle relative to said sleeves when said sleeves are in stowed position; and
   k. said stowed position of said trailing cart being reachable by raising the front end of said trailing cart to release said interconnection mechanism and moving said trailing cart forwardly to a vertically stacked position in which said front end of said trailing cart is supported by the platform of said lead cart and the rear end of said trailing cart is supported on the castered wheels of said trailing cart.

2. In a demountable longitudinally extending multiple platform cart device:
   a. a lead cart having a horizontal load-supporting platform with sides and front and rear ends;
   b. laterally spaced front and rear wheels carrying said front and rear ends of said lead cart platform;
   c. a trailing cart movable between operative and stowed positions, having a horizontal load-supporting trailing platform with sides and front and rear ends;
   d. wheels mounted on and carrying said rear end of said trailing cart platform; and
   e. a releasable interconnection mechanism for coupling said rear end of said lead cart demountably to said front end of sail trailing cart with the platform of said lead cart substantially in longitudinal alignment with the platform of said trailing cart and furnishing support for said front end of said trailing cart;

f. said interconnection mechanism comprising an upstanding flange carried by said rear end of the lead cart and extending at a spaced distance rearwardly of said platform of said lead cart from side to side of said platform of said lead cart to provide an upwardly open side to side continuous slit adjacent to said rear end of said lead cart platform, and further comprising a downwardly extending flange extending from side to side of said trailing cart platform carried on said front end of said platform of said trailing cart to be received with said slit; said interconnection mechanism further being provided with stop surfaces for limiting the vertical position of said downwardly extending flange in said slit and lateral stop surfaces carried at a spaced lateral distance outward of said platforms for preventing relative lateral shifting of said rear end of said lead cart platform and front end of said trailing cart platform beyond a predetermined limit.

3. The cart device of claim 2 wherein said wheels carrying the rear end of said lead cart platform are differently laterally spaced than said rearmost wheels carrying said rear end of said trailing cart platform and so positioned as to be movable telescopically relative to them, and said stowed position of said trailing cart is reachable by raising the front end of said trailing cart to release said interconnection mechanism and moving said trailing cart forwardly to a vertically stacked position in which said front of said trailing cart is supported by the platform of said lead cart.

4. The device of claim 3 wherein said wheels carrying said rear end of said lead cart platform are non-castered and the front wheels carrying said lead cart platform and rearmost wheels carrying said rear end of said trailing cart platform are castered.

5. In a demountable multiple platform cart assembly;
   a. a lead cart having a longitudinally extending flatbed load-supporting platform with sides and front and rear ends;
   b. wheel mechanism carrying said rear end of said lead cart platform;
   c. a fitting mounted on each side of said platform near said front end, each said fitting carrying an open-ended sleeve mounted for pivotal movement from a generally vertical operative position to a generally horizontal stowed position;
   d. a handle having laterally spaced legs mounting castered front wheels slideably received in said sleeves for telescopic movement from a vertically extending operative position projecting above said lead cart platform when said sleeves are in operative position to a telescoped longitudinally rearwardly extending stowed position beneath said lead cart platform when said sleeves are pivoted to stowed position;
   e. a trailing cart movable between operative and stowed positions, having a longitudinally extending flatbed load-supporting trailing platform with sides and front and rear ends;
   f. wheels carrying said rear end of said trailing cart platform;
   g. a releasable interconnection mechanism coupling said rear end of said lead cart demountably to said front end of said trailing cart and furnishing support for the front end of said trailing cart;
   h. a lock mechanism carried beneath said lead cart platform and comprising a longitudinally extending part at each side of said cart spaced vertically from said platform and configured to provide a longitudinally rearwardly extending rear end access passage opening above said part leading to an upwardly opening locking recess; and
   i. a lock rod supported on each of said legs of said handle positioned to be received in each said locking recess when said handle is telescoped during pivoting movement of said sleeves to stowed position to a longitudinally rearwardly extending position in which said locking rod when swung upwardly is rearward of said rear end access openings and can be brought forwardly through said rear end access passage openings to be received within said locking recesses with forward longitudinal telescopic movement of said handle relative to said sleeves when said sleeves are in stowed position.

6. The assembly defined in claim 5 wherein said wheels carrying said rear end of said lead cart platform are differently laterally spaced than said rearmost wheels carrying said rear end of said trailing cart platform and are laterally disposed to be movable between them when said trailing cart is moved forwardly to stowed position, said stowed position of said trailing cart being reachable by raising the front end of said trailing cart and releasing said interconnection mechanism and moving said trailing cart forwardly to a vertically stacked position in which said front end of said trailing cart is supported on the platform of said lead cart and on said rearmost wheels carrying said rear end of said trailing cart platform.

7. The assembly of claim 6 wherein said wheels carrying said rear end of said lead cart platform are non-castered and said rearmost wheels carrying said rear end of said trailing cart platform are castered.

8. In a method of conditioning a platform cart for storage, the cart comprising a longitudinally extending horizontal load-supporting platform, with sides and front and rear ends, supported by wheels at one end of said platform; a fitting mounted on each side of said platform at its said opposite end, each said fitting carrying an open-ended sleeve mounted for pivotal movement from a generally vertical operative position to a generally horizontal stowed position; laterally spaced handle legs, mounting castered end wheels, slideably received in said sleeves for telescopic movement from a vertically extending operative position when said sleeves are in operative position to a telescoped longitudinally extending stowed position beneath said cart platform when said sleeves are pivoted to a stowed position; a lock mechanism carried beneath said cart platform and comprising a longitudinally rearwardly extending part having front and rear ends and configured to provide a rear end access opening leading longitudinally to a locking recess; and a lock element carried by said legs of said handle; said method comprising:
   a. pivoting said sleeves to stowed position while telescoping said handle legs rearwardly relative to said sleeves to a longitudinally extending position beneath said platform of said cart and swinging said handle legs and said locking element upwardly to a position in which said locking element is longitudinally rearward of said rear end access opening and longitudinally aligned therewith; and
   b. moving said handle legs longitudinally forwardly to dispose said locking element within said locking recess with telescopic movement of said handle legs relative to said sleeves when said sleeves are substantially in stowed position.

9. The method of claim 8 wherein the cart includes a lead cart and a disconnectable trailing cart coupled by interconnecting mechanism, said trailing cart being supported on rear wheels and movable between operative and stowed positions, the method including raising the front end of said trailing cart and releasing said interconnecting mechanism, and then moving said trailing cart forwardly to a position in which said front end of said trailing cart is supported in stacked relation on the platform of said lead cart and supported on said rear wheels of said trailing cart.

10. In a demountable multiple platform cart assembly;
   a. a lead cart having a longitudinally extending flatbed load-supporting platform with sides and front and rear ends;
   b. wheel mechanism carrying said rear end of said lead cart platform;
   c. a fitting mounted on each side of said platform near said front end, each said fitting carrying an open-ended sleeve mounted for pivotal movement from a generally vertical operative position to a generally horizontal stowed position;
   d. a handle having laterally spaced legs mounting castered front wheels slideably received in said sleeves for telescopic movement from a vertically extending operative position projecting above said lead cart platform when said sleeves are in operative position to a telescoped stowed position beneath said lead cart platform when said sleeves are pivoted to stowed position;
   e. a dismountable trailing cart having a longitudinally extending flatbed load-supporting trailing platform with sides and front and rear ends;
   f. wheels carrying said rear end of said trailing cart platform;
   g. a releasable interconnection mechanism coupling said rear end of said lead cart demountably to said front end of said trailing cart and furnishing support for the front end of said trailing cart;
   h. a latch mechanism with front and rear end walls carried beneath said lead cart platform and comprising a longitudinally extending locking part configured to provide a longitudinally extending end wall access passage leading longitudinally to a locking recess; and
   i. a lock rod supported on said handle positioned to be longitudinally passed through said access passage and into said locking recess when said handle is telescoped relative to said sleeves to a position in which said locking rod when swung upwardly is longitudinally spaced from said end access opening in longitudinal alignment therewith and can be longitudinally telescoped through said access passage to be received within said locking recess with longitudinal telescopic movement of said handle relative to said sleeves when said sleeves are in substantially stowed position.

* * * * *